(12) United States Patent  (10) Patent No.: US 8,307,728 B1
Haines  (45) Date of Patent: Nov. 13, 2012

(54) REAR END GEAR BOX WITH OFFSET INPUT SHAFT FOR RACING CARS

(75) Inventor: James S. Haines, Lancaster, PA (US)

(73) Assignee: Diversified Machine, Inc., Lancaster, PA (US)

( * ) Notice: Subject to any disclaimer, the term of this patent is extended or adjusted under 35 U.S.C. 154(b) by 1045 days.

(21) Appl. No.: 12/264,243

(22) Filed: Nov. 3, 2008

(51) Int. Cl.
*F16H 3/08* (2006.01)
*F16H 1/12* (2006.01)
*F16H 1/20* (2006.01)

(52) U.S. Cl. ............................................. 74/325; 74/416

(58) Field of Classification Search ................. 74/665 F, 74/665 GA, 665 GB, 665 GC, 665 H, 665 S, 74/665 T, 416, 417, 606 R; 475/198, 200, 475/220; 192/69.9; 403/359.1, 359.6
See application file for complete search history.

(56) References Cited

U.S. PATENT DOCUMENTS

| | | | | |
|---|---|---|---|---|
| 2,566,253 A | * | 8/1951 | Schmitter | 74/420 |
| 3,504,776 A | * | 4/1970 | Misenti | 192/55.5 |
| 3,645,153 A | * | 2/1972 | Northcraft | 74/370 |
| 3,862,672 A | * | 1/1975 | Tappen et al. | 184/6.12 |
| 5,634,374 A | * | 6/1997 | Depietri | 74/420 |
| 5,953,964 A | * | 9/1999 | Cognigni et al. | 74/606 R |
| 7,497,801 B2 | * | 3/2009 | Kakinami et al. | 475/222 |
| 7,707,721 B2 | * | 5/2010 | Leibold | 29/893.1 |
| 2007/0219040 A1 | * | 9/2007 | Garcia et al. | 475/220 |

OTHER PUBLICATIONS

Undated Advertisement for Bulldog Rear Ends by Diversified Racing, Inc.

* cited by examiner

*Primary Examiner* — Troy Chambers
*Assistant Examiner* — Michael Gonzalez
(74) *Attorney, Agent, or Firm* — Miller Law Group, PLLC

(57) ABSTRACT

A rear end gear box for a racing car has the swivel coupler and the bearing rotatably supporting the swivel coupler mounted within the rear end housing so that oil within the rear end housing will lubricate the swivel coupler and its bearing. The input shaft delivering rotational power from the engine is offset to the right of the driven shaft mounted within the rear end housing so that the center of gravity of the rear end is shifted to the left of the car centerline to increase stability of the car in turns. The recessed swivel coupler has an extended operating life due to increase stability and rigidity provided by the support from the housing structure. The cover for the back end of the rear end structure where the transfer gears are located is provided with an O-ring to facilitate a quick change of the transfer gears.

11 Claims, 9 Drawing Sheets

Fig. 8
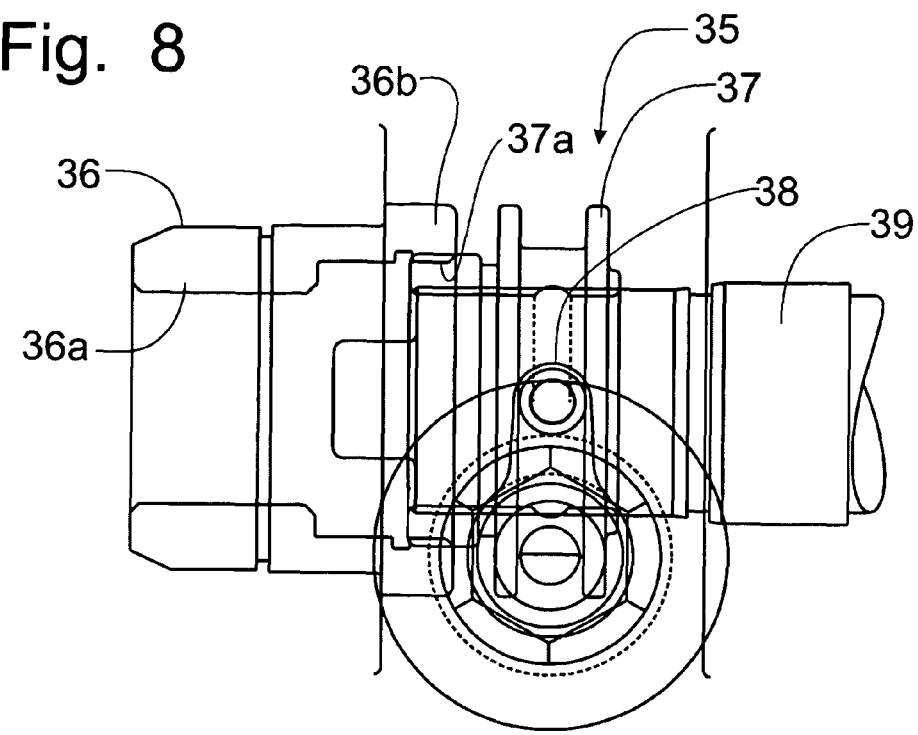
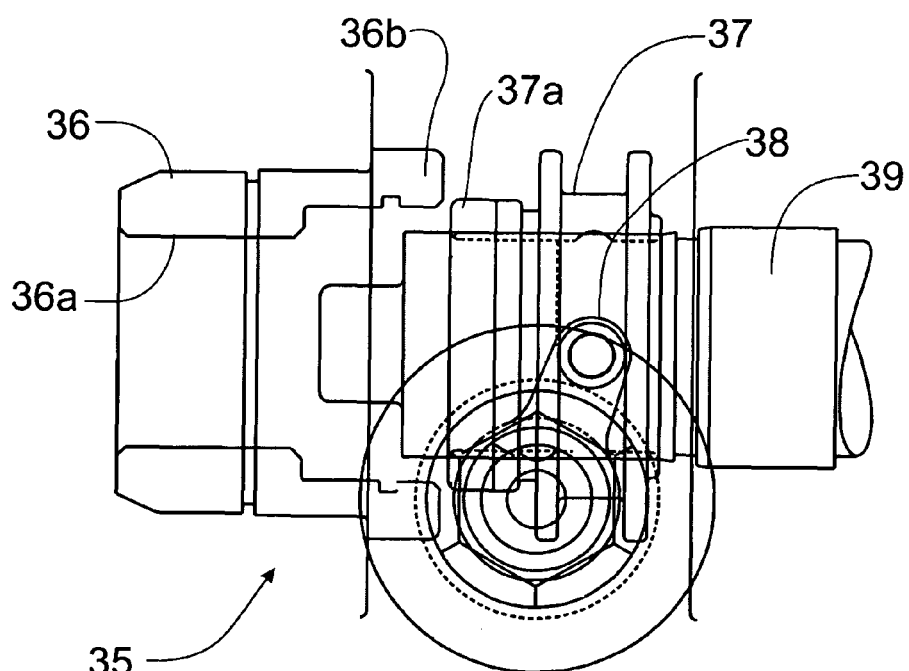
Fig. 9

Fig. 10
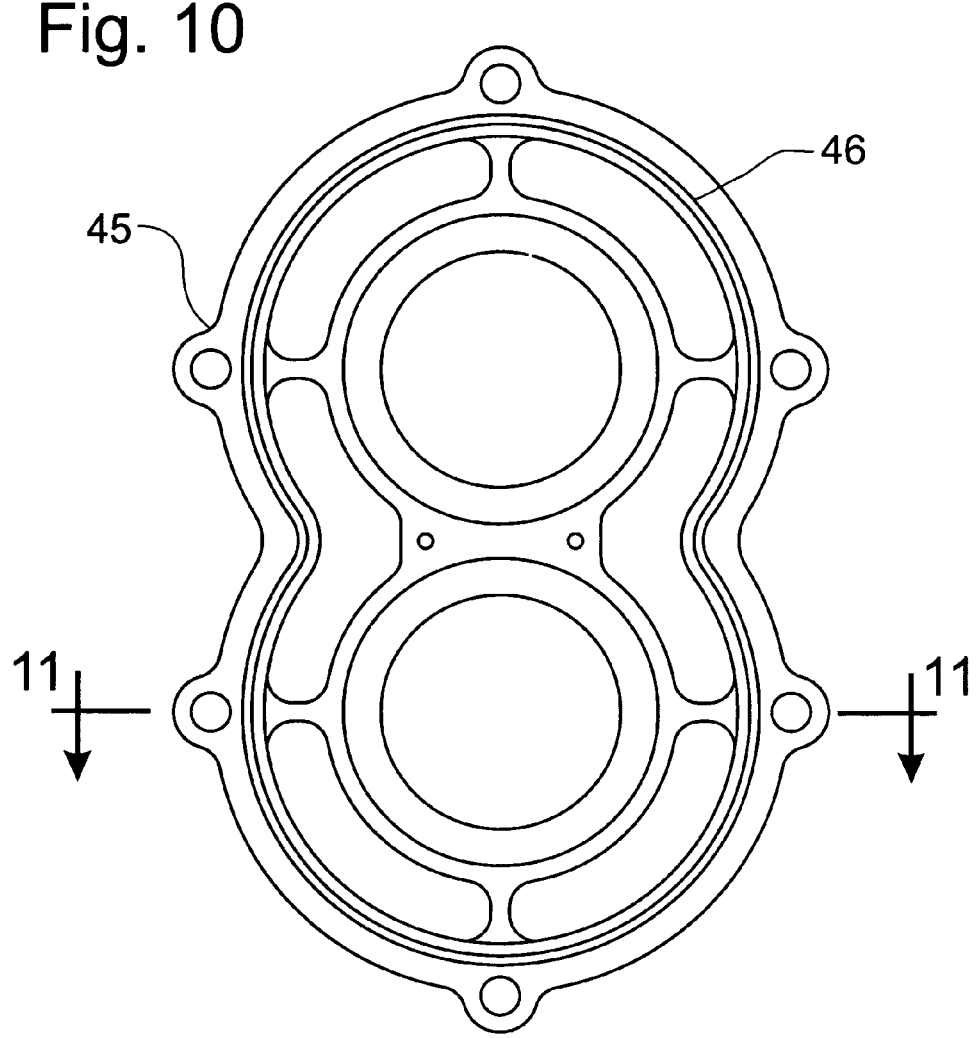
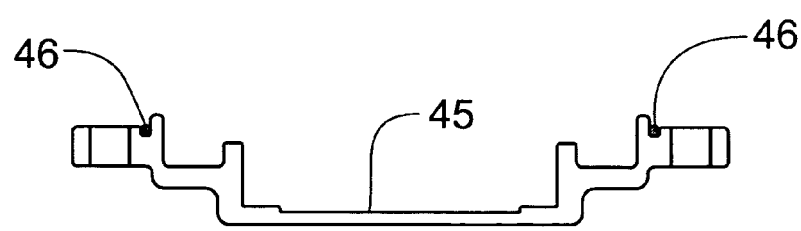
Fig. 11

REAR END GEAR BOX WITH OFFSET INPUT SHAFT FOR RACING CARS

BACKGROUND OF THE INVENTION

The present invention relates generally to a rear end for a racing car used in sprint racing, and, more particularly, to a rear end having offset drive gears for transferring rotational power from the engine to the rear axle of the racing car.

Sprint cars and smaller racing cars are powered by an engine supported in a frame and connected to a rear end gear box that transfers rotational power to the rear wheels of the racing car. The rear end gear box has a disconnect mechanism that interrupts the transmission of rotational power to the rear wheels. When the racing car is being operated on the race track, the rear end gear box is engaged to transfer power from the engine. When the operator desires to stop the movement of the racing car, the rear end gear box is operably disconnected from the engine so that rotational power is no longer being transferred.

In current state of the art racing car rear ends, the drive shaft connected between the engine and the rear end gear box transfers a substantial amount of power to the rear end. In some sprint cars, the engine can produce 950 horsepower to drive the racing car which may weigh only about 1300 pounds. The torque involved in the transfer of this much power, along with the external forces encountered during the racing of the sprint car, results in a movement of the drive shaft relative to the rear end. This slight "whipping" and vibrational movement of the drive shaft can place substantial wear on the bearings housed within the rear end. To minimize the wear problem, a swivel coupling has been adopted so that the swivel coupling can absorb the movement of the drive shaft without causing substantial wear problems.

The placement of a swivel coupling into the engine end of the rear end gear box causes spatial problems. Because of the ring gear contained within the rear end gear box to drive the rear axle of the racing car, the swivel coupling and a bearing for rotationally supporting the swivel coupling are located on the outside of the rear end housing. As a result, the bearing has to be a sealed bearing that contains its own lubricant, since the bearing is not in flow communication with the oil flow within the rear end housing. If the swivel coupling were located inside the conventional gear box, the interior portion of the swivel coupling would interfere with the ring gear. Accordingly, the swivel coupling is positioned outside the rear end housing where stability and rigidity of the swivel coupling is compromised. Furthermore, the swivel coupling is not lubricated from the oil within the rear end housing.

Sprint racing cars only turn to the left when racing around the track. Manufacturers have employed different strategies for shifting the center of gravity of the racing car to the left of the car centerline. One concept was to shift the engine to the left of the car centerline; however, the resulting coupling of the drive shaft between the engine and the rear end placed too much stress on the swivel coupler, reducing the life of the swivel coupler. Extending the life of the bearings and the swivel coupler is important to successful operation of the racing cars. If the swivel coupler or the bearings fail during a race, the race car is finished for the night.

Therefore, it would be desirable to provide a rear end structure for a racing car that would be operable to recess the swivel coupler and the associated bearing internal of the rear end housing so that the swivel coupler and the bearing would be lubricated by the oil within the rear end housing. It would also be desirable to provide a rear end structure for a racing car that results in a shifting of the center of gravity of the racing car to the left to increase the stability of the racing car while make turns on the race track.

SUMMARY OF THE INVENTION

It is an object of this invention to provide a rear end gear box for a racing car in which the swivel coupling connecting the drive shaft from the engine to the rear end drive mechanism is mounted within the rear end housing.

It is another object of this invention to provide a rear end structure that shifts the center of gravity of the racing car to the left of the centerline of the car.

It is still another object of this invention to offset the drive shaft relative to the driven shaft within the rear end gear box structure.

It is a feature of this invention that the swivel coupler is supported internally of the rear end housing.

It is another feature of this invention that the bearing associated with supporting the swivel coupler is also mounted internally of the rear end housing.

It is an advantage of this invention that the swivel coupler and the bearing rotatably supporting the swivel coupler are lubricated by the oil within the rear end gear box housing.

It is another advantage of this invention that the supporting of the swivel coupler within the rear end housing increase the stability and the rigidity of the swivel coupler.

It is still another advantage of this invention that the operative life of the swivel coupler is increased by supporting the swivel coupler within the rear end gear box housing.

It is still another feature of this invention that the drive shaft is located in the rear end housing at an offset from a vertical plane extending through the center of the rear end housing in alignment with the driven shaft mounted within the rear end gear box housing.

It is yet another feature of this invention that the positioning of the drive shaft of the rear end gear box on the centerline of the racing car in alignment with the engine drive shaft places the center of gravity of the rear end structure to the left of the centerline of the racing car.

It is yet another advantage of this invention that rear end gear box shifts the center of gravity of the racing car to the left of the car centerline.

It is still another advantage of this invention that the rear end housing increases the stability of the racing car while turning around the race track.

It is still another feature of this invention that the cover over the transfer gears at the back end of the rear end gear box structure incorporates an O-ring to seal the cover against the rear end gear box housing.

It is still another advantage of this invention that the use of the O-ring allows for the cover to be closed quickly for a quick change of the transfer gears.

It is yet another object of this invention to provide a rear end gear box for a sprint racing car which is durable in construction, inexpensive of manufacture, carefree of maintenance, facile in assemblage, and simple and effective in use.

These and other objects, features and advantages are accomplished according to the instant invention by providing a rear end gear box for a racing car in which the swivel coupler and the bearing rotatably supporting the swivel coupler are mounted within the rear end housing so that oil within the rear end housing will lubricate the swivel coupler and its bearing. The input shaft delivering rotational power from the engine is offset to the right of the driven shaft within the rear end housing so that the center of gravity of the rear end is shifted to the left of the car centerline to increase stability of the car in turns. The recessed swivel coupler has an extended operating life due to increase stability and rigidity provided by the support from the housing structure. The cover for the back end of the rear end structure where the transfer gears are located is provided with an O-ring to facilitate a quick change of the transfer gears.

BRIEF DESCRIPTION OF THE DRAWINGS

The advantages of this invention will be apparent upon consideration of the following detailed disclosure of the invention, especially when taken in conjunction with the accompanying drawings wherein:

FIG. 8 is an enlarged elevational view of the shift coupler apparatus with the shift coupler in the "on" position;

FIG. 9 is an enlarged elevational view of the shift coupler apparatus similar to that of FIG. 9, but showing the shift coupler in the "off" position;

FIG. 10 is a plan view of the interior side of the cover for the transfer cowling to show the O-ring disposed within the cover; and FIG. 11 is a cross-sectional view of the cover for the transfer cowling taken along lines 11-11.

DETAILED DESCRIPTION OF THE PREFERRED EMBODIMENT

Figure 1:
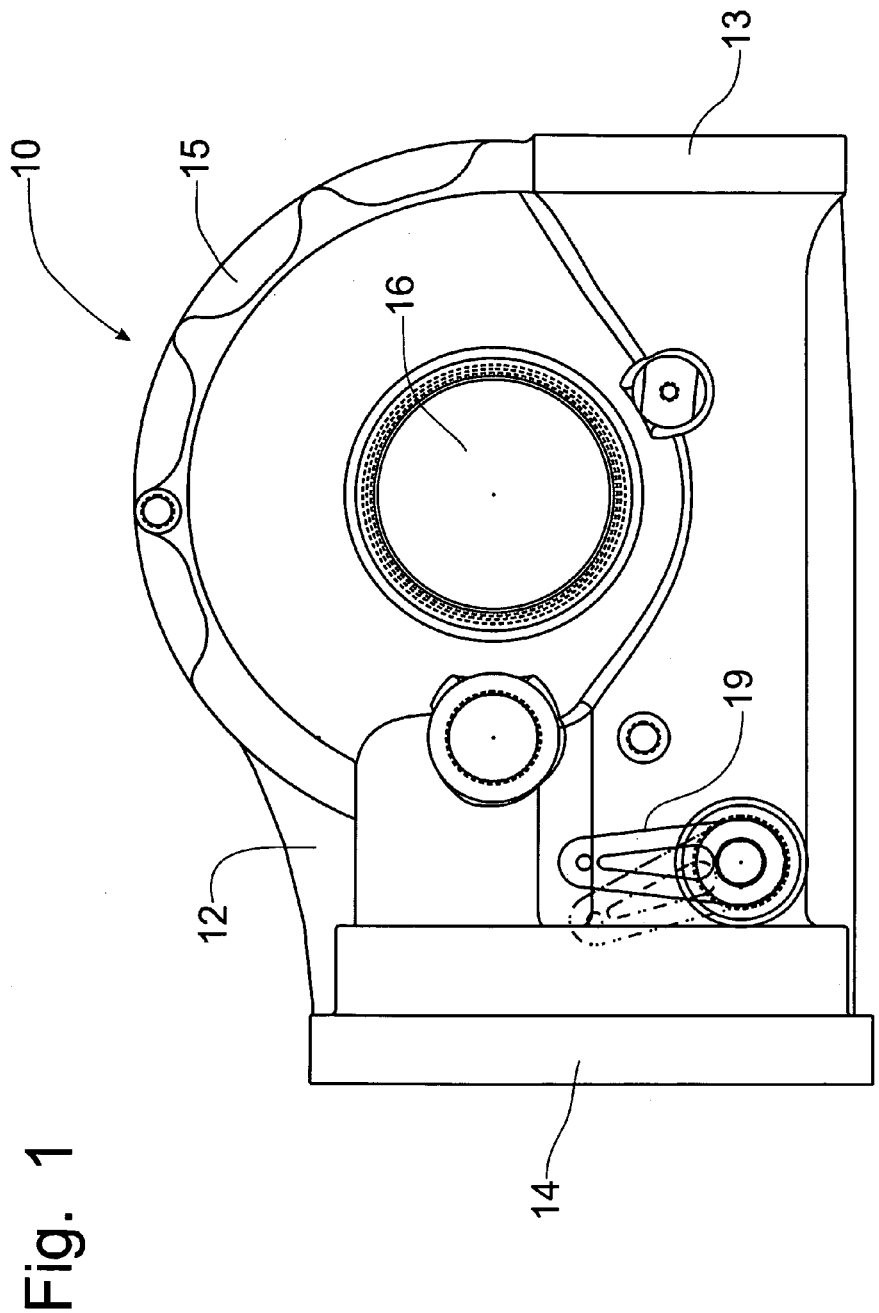
FIG. 1 is a side elevational view of a rear end gear box housing incorporating the principles of the instant invention, the front or engine end of the rear end gear box being to the right side of the figure and the back end on the left side, the movement of the external shift lever being depicted in phantom.
Figure 2:
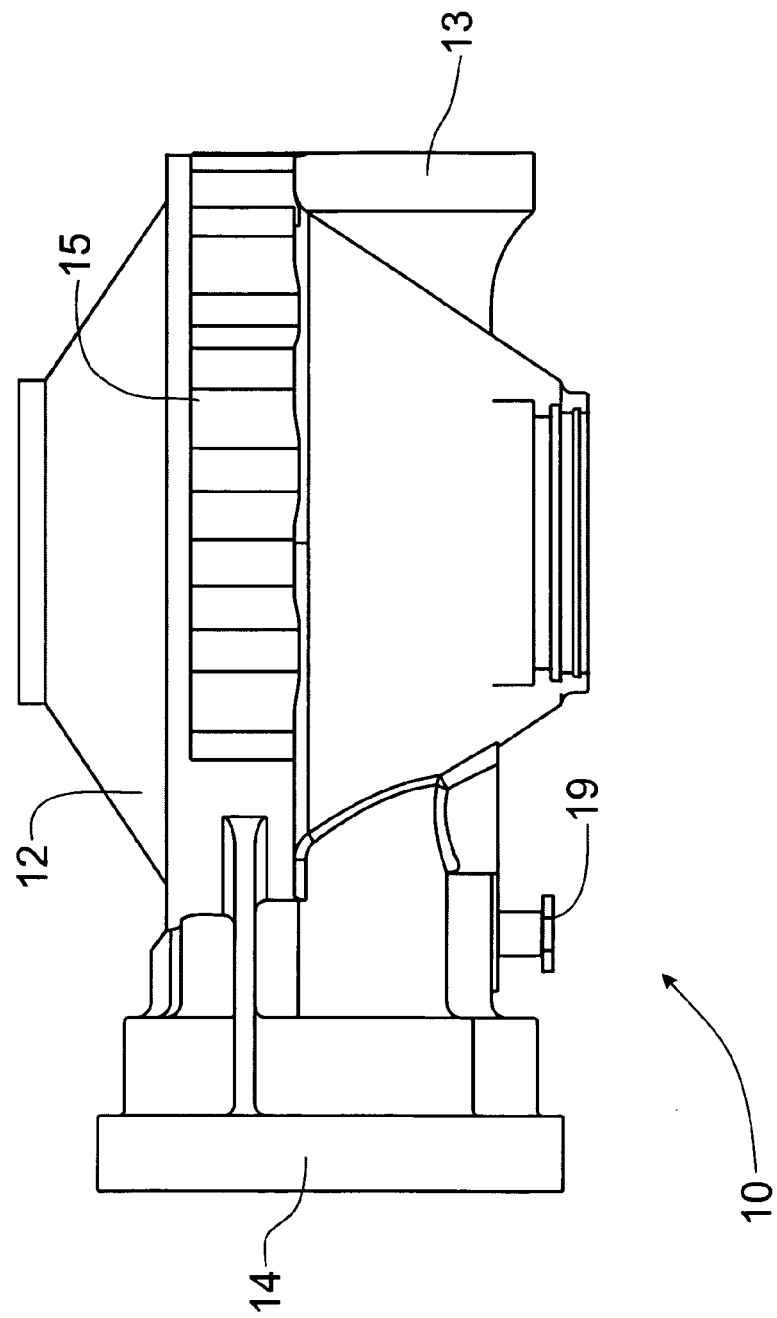
FIG. 2 is a top plan view of the rear end gear box housing depicted in FIG. 1.
Figure 3:
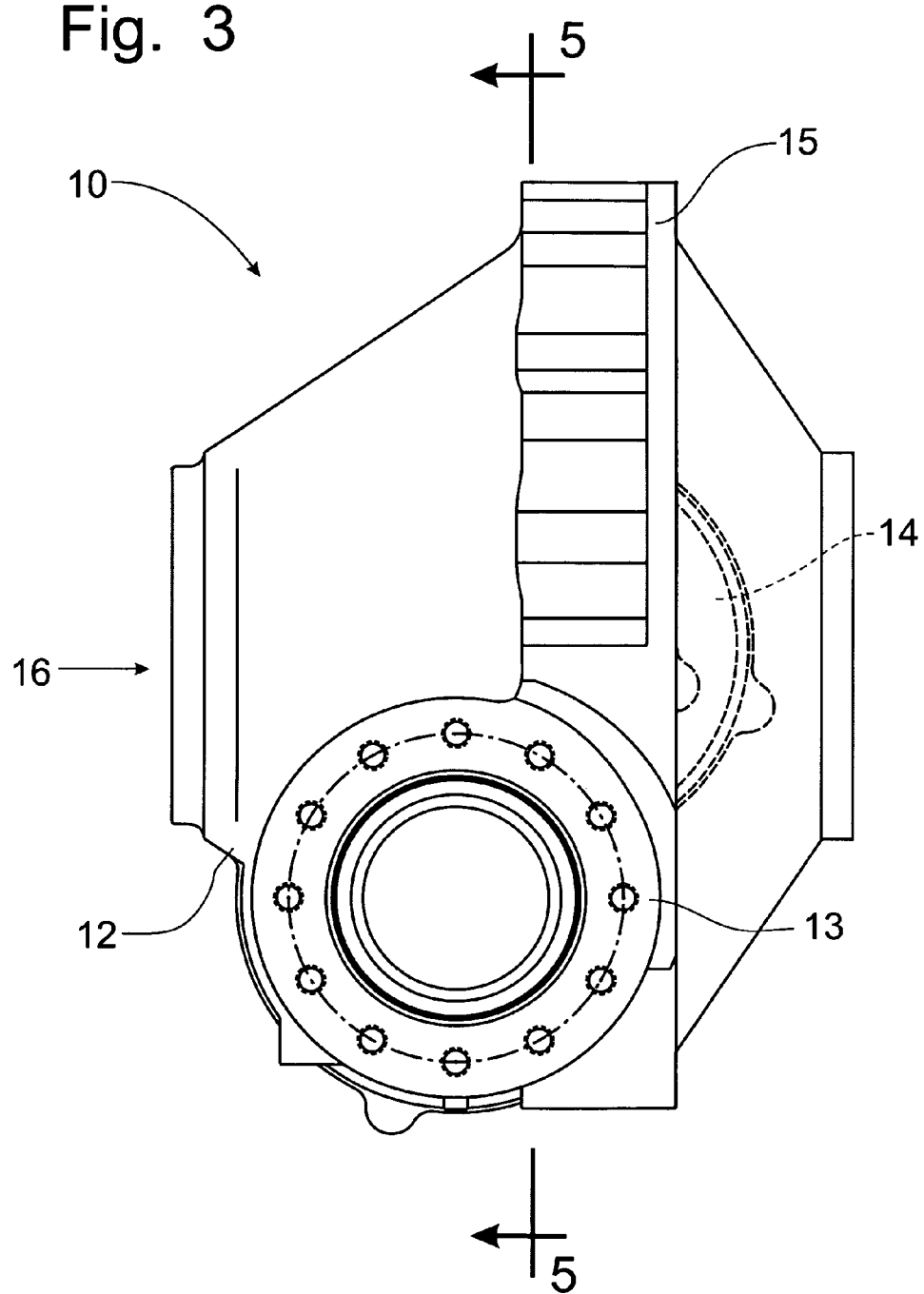
FIG. 3 is an end elevational view of the engine end of the rear end gear box housing shown in FIGS. 1 and 2.

Referring now to the drawings, a rear end gear box forming part of a racing car and incorporating the principles of the instant invention can best be seen. The rear end gear box 10 is deployed at the rear axle of a racing car, such as a sprint car, in which the engine (not shown) is connected directly to the rear end gear box 10 which is operable to transfer the rotational power from the engine to the rear axle to drive the racing car around the race track. Such racing cars do not utilize a multiple gear transmission between the engine and the rear end gear box 10, as these racing cars only have two operating conditions, on and off. Accordingly, the rear end gear box 10 includes a shifter 19 that is operable to operatively connect the input from the engine to the rear axle, or to disconnect the input from the engine to the rear axle.

The rear end gear box 10 includes a housing 12 that includes a front input cowling 13, a rear transfer cowling 14 and a central ring gear cowling 15. The rear axle 16 of the racing car passes through the center of the ring gear cowling 15 and extends transversely therethrough to drive the rear wheels (not shown) on opposing sides of the rear end gear box 10. The shifter 19 is mounted on the housing 12 near the transfer cowling 14. The shifter 19 is operatively connected, such as via a push/pull cable (not shown) to a shift lever (not shown) deployed in the operator's cockpit to control the on/off operative function of the racing car. The rotative movement of the shifter 19 causes a linear movement of the shift mechanism ** within the rear end gear box 10, as will be described in greater detail below.

Figure 5:
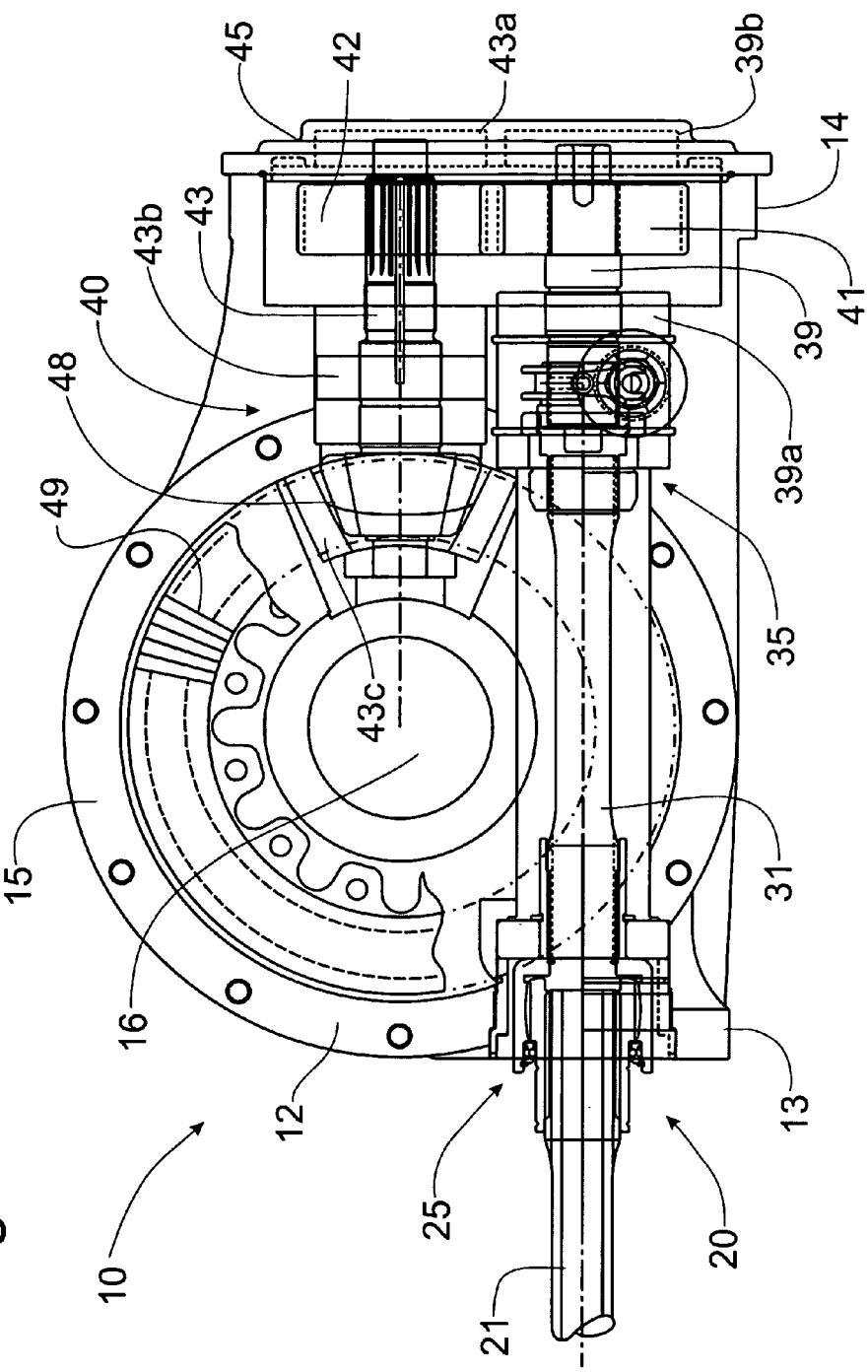
FIG. 5 is a cross sectional view through the rear end gear box taken along lines 5-5 of FIG. 3, the drive components being depicted for transferring the rotational power from the engine of the racing car to the rear axle.
Figure 6:
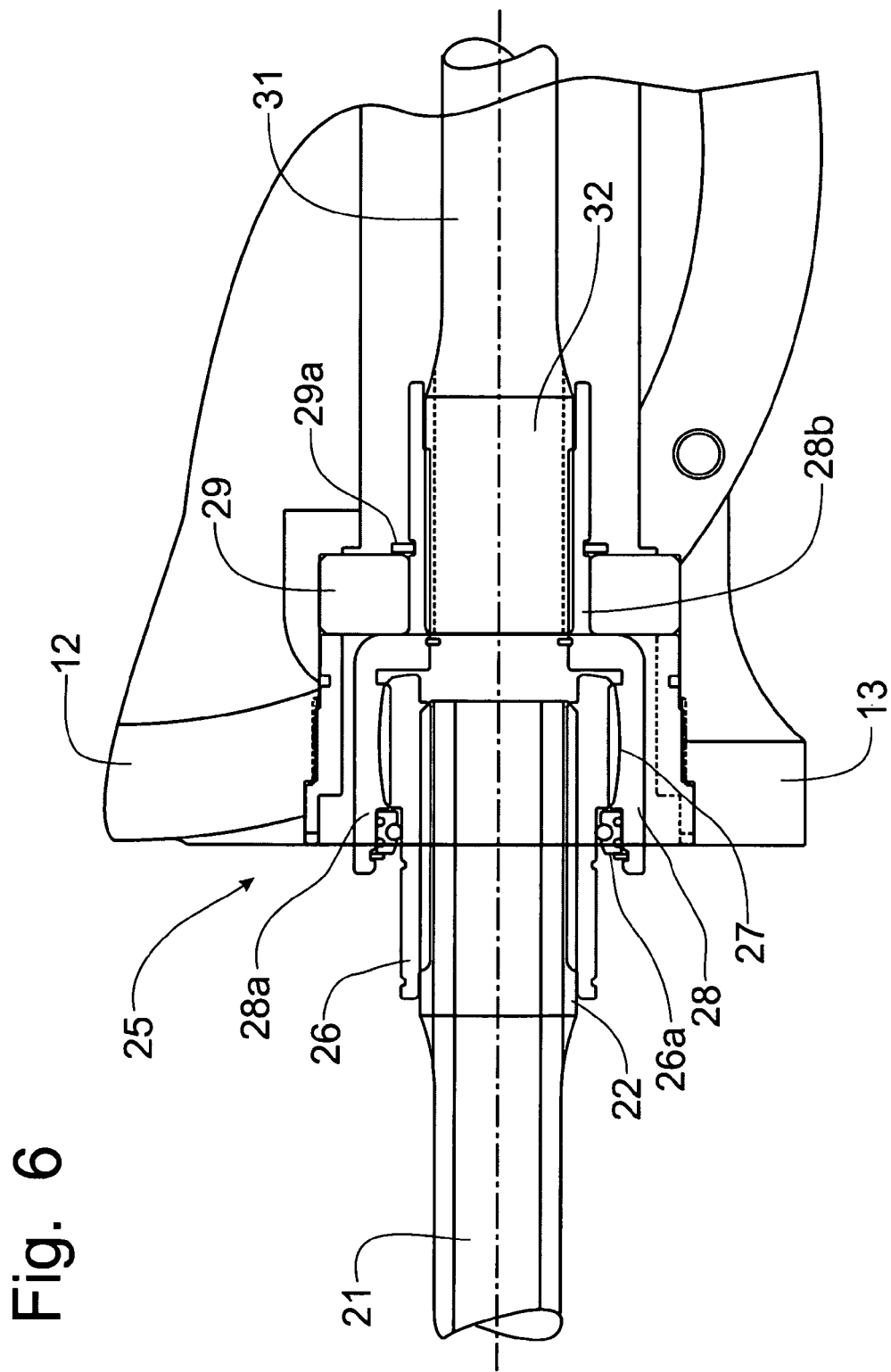
FIG. 6 is an enlarged partial cross-sectional view of the input driveline to depict the swivel coupling recessed into the input cowling of the housing.

The operation of the rear end gear box 10 is best seen in FIG. 5. The power input shaft 21 is part of the input driveline 20 connected directly to the engine (not shown) and delivers rotational power from the engine into the rear end gear box 10. Because of the amount of power delivered from the engine and the operational loads associated with the movement of the racing car around a race track, the power input shaft 21 is subject to a substantial amount of vibration and movement. As depicted in FIG. 6, to minimize the damage caused for an oscillating power input shaft 21, the power input shaft 21 is connected to a swivel coupler 25 that includes a coupling sleeve 26 mounted on the splines 22 at the end of the power input shaft 21. The coupling sleeve 26 is formed with rounded crown splines 27 that accommodate slight movements of the input shaft 21 relative to the rear end 10 while engaged with the transfer coupler 28 that is rotatably supported within the front input cowling 13 by bearings 28a mounting in the housing 12. A snap ring 29a retains the transfer coupler 28 against the bearing 29 and retains the swivel coupler 25 within the front input cowling 13. The coupling sleeve 26 is secured within the transfer coupler 28 by a seal 26a secured by a snap ring to allow the movement of the coupling sleeve 26 relative to the transfer coupler 28.

Thus, the power input shaft 21 rotatably drives the coupling sleeve 26, through interengaged splines, and the coupling sleeve 26 drives the transfer coupler 28 which has an enlarged front end 28a to accommodate the movement of the rounded crown splines 27 of the coupling sleeve 26 and a smaller rearward end 28b projecting rearwardly of the bearing 29. A transfer shaft 31 has a forward portion 32 received within the rearward end 28b of the transfer coupler 28 so that the rotation of the transfer coupler 28 drives the rotation of the transfer shaft 31.

Figure 7:
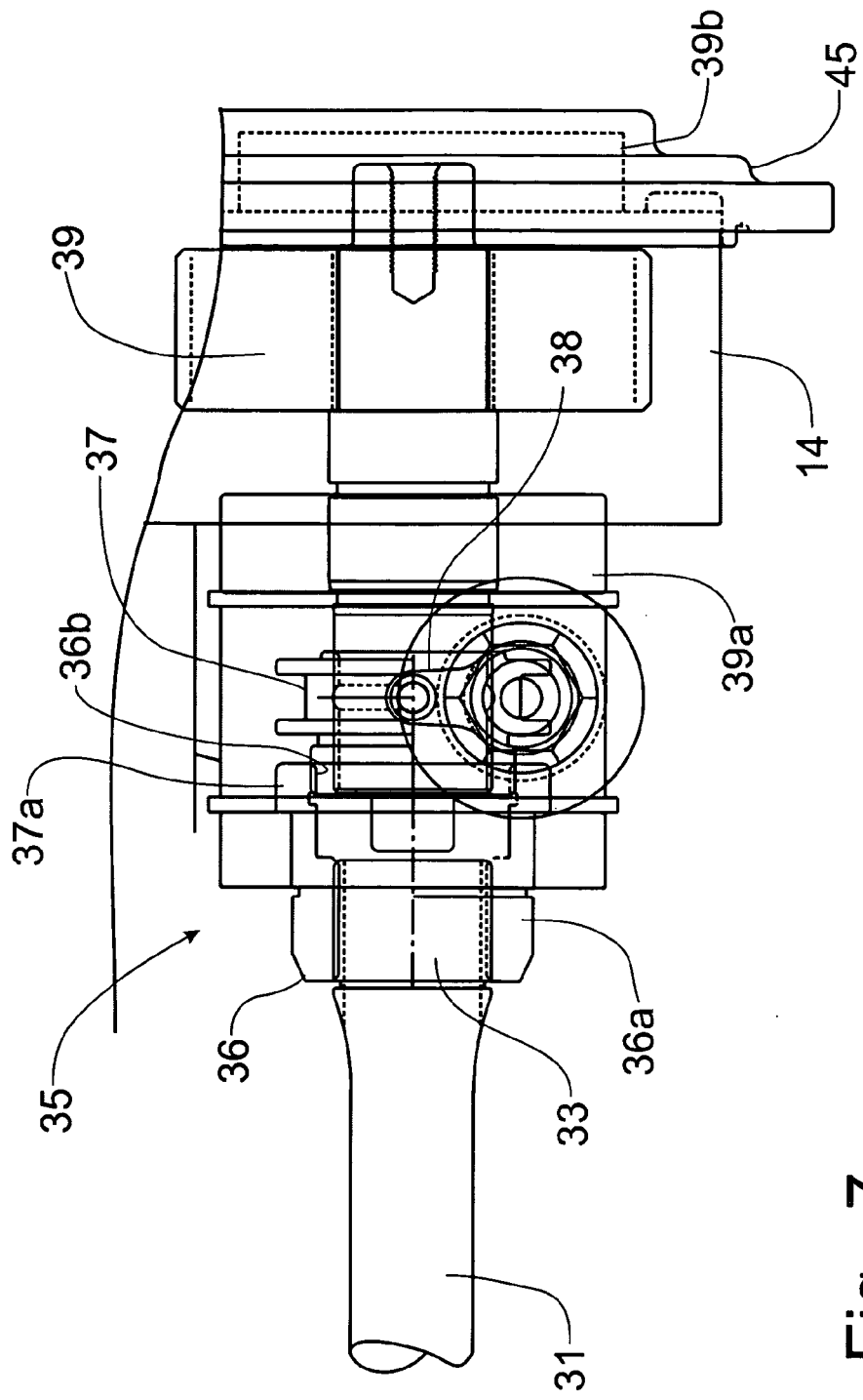
FIG. 7 is an enlarged partial cross-sectional view of the input driveline to depict the shift coupler.

As best seen in FIGS. 5 and 7, the rearward end 33 of the transfer shaft 31 drives a shift coupler 35 which has a forward portion 36 supported by the bearings 36a and engaged with the rearward end 33 of the transfer shaft 31. The shift coupler 35 also includes a linearly movable shift collar 37 having splines 37a engagable with the rearward splines 36b and being slidable over the stub shaft 39 rotatably supported by bearings 39a. The shift collar 37 captures the internal shift lever 38 connected to the shifter 19 so that when the shifter 19 is pivoted the internal shift lever 38 slides the shift collar 37 on the stub shaft 39 to move the splines 37a on the shift collar into or out of engagement with the splines 36b on the forward portion 36 of the shift coupler 35.

In operation, which is best seen in FIGS. 5 and 7-9, the transfer shaft 31 rotatably drives the forward portion 35 of the shift coupler 35. The stub shaft 39, which carries the shift collar 37 thereon for sliding movement relative to the stub shaft 39 along splines formed on the stub shaft 39 so that the shift collar 37 transfers rotational power from the forward portion 36 of the shift coupler 35 to the stub shaft 39 when the shift collar 37 is slid into engagement with the rearward splines 37b of the forward portion 37 of the shift coupler 35. When the shift collar 37 is moved out of engagement with the forward portion 36 of the shift coupler 35, the driveline 20 is disconnected and rotational power cannot be transferred from the engine to the rear axle 16.

Referring again to FIG. 5, the transfer cowling 14 houses the bearing 39a rotatably supporting the stub shaft 39 and also a second bearing 39b that also rotatably supports the stub shaft 39. A drive gear 41 is mounted on the stub shaft 39 between the two stub shaft bearings 39a, 39b within the transfer cowling 14 for rotation with the stub shaft 39. The drive gear is operatively engaged with a driven gear 42 mounted on a second stub shaft 43, forming the output driveline 40, which is supported by three bearings 43a, 43b and 43c. The first bearing 43a is located in the transfer cowling 14 above the bearing 39b for the first stub shaft 39. The second bearing 43b is located at the central portion of the stub shaft 43, and the third bearing 43c is located at the inner distal end of the stub shaft 43.

The second stub shaft 43 has the driven gear 42 supported within the transfer cowling 14 along with the drive gear 41 so that both the drive gear 41 and the driven gear 42 can be accessed quickly and easily by removing the cover 45 that is bolted to and sealed against the transfer cowling 14. Preferably, as depicted in FIGS. 10 and 11, the cover 45 carries an O-ring 46 that seals the cover 45 when compressed against the peripheral ring of the transfer cowling 14. The O-ring 46 provides an effective seal to prevent leakage of lubricating oil from the housing 12, but is carried by the cover 45 so that the replacement of the cover 45 on the transfer cowling 14 does not require the manipulation of a conventional gasket that is placed between the cover 45 and the transfer cowling 14.

Referring again to FIG. 5, the second stub shaft 43 also carries at the inner distal end a pinion 48 that is engagable with a ring gear 49 mounted within the ring rear cowling 15. The ring gear 49 is affixed to the rear axle 16 to transfer rotational power thereto and affect a driving of the rear axle 16. Accordingly, the driveline 20 transfers rotational power from the engine through the swivel coupling 25, the shift coupler 35, the interengaged transfer gears 41, 42 and the pinion 48 to drive the ring gear 49 and the rear axle 49.

Figure 4:
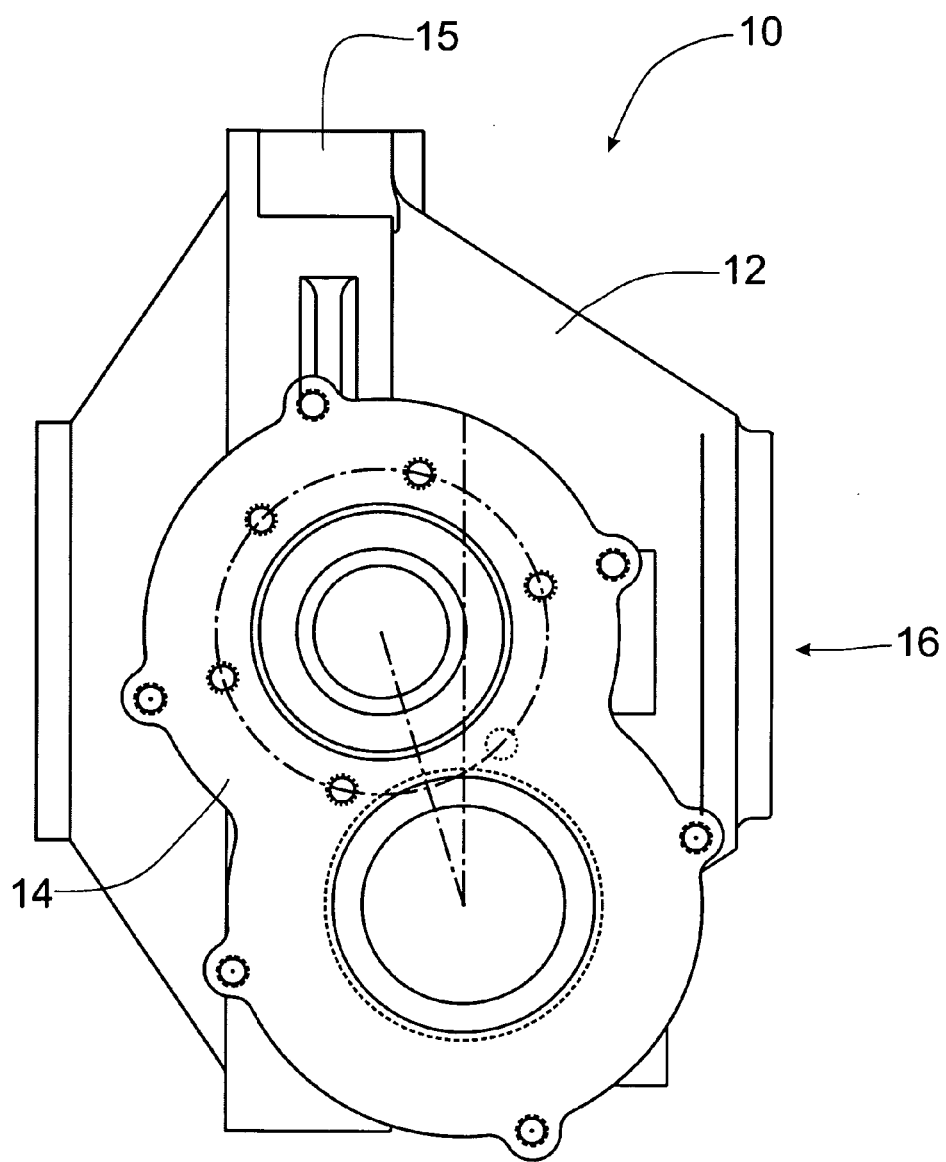
FIG. 4 is a end elevational view of the back end of the rear end gear box housing opposite to the view of FIG. 3.

Placement of the swivel coupling 25 internally of the housing 12 would normally interfere with the rotation of the ring gear 49. To allow the recessing of the swivel coupling 25 into the housing 12 to allow the housing 12 to provide a stable and rigid support of the swivel coupling 25, the power input shaft 21 is offset to the right of the line of the second stub shaft 43 carrying the pinion 48. Specifically, the center of the power input shaft 21, as well as the transfer shaft 31 and the first stub shaft 39, were rotated approximately 16 degrees about the centerline of the second stub shaft 43, as is represented in FIG. 4. Accordingly, a vertical plane passing through the center of the first stub shaft 39 is offset to the right of a vertical plane passing through the center of the second stub shaft 43.

Since the power input shaft 21 is properly mounted in direct longitudinal alignment with the engine, particularly due to the amount of power being transferred through the power input shaft 21, the entire remaining mass of the rear end gear box 10 has the center of gravity shifted to the left, as compared to a conventional rear end gear box structure with the first and second stub shafts 39, 43 being vertically aligned. The shift in the center of gravity of the rear end gear box 10 has a resulting shift in the center of gravity of the entire racing car to the left of the longitudinal centerline of the racing car. As a consequence, the racing car has more stability in turns around the race track.

Recessing the swivel coupling 25 and the bearing 29 associated with the swivel coupling 25 into the housing 12 allows both the swivel coupling 25 and the bearing 29 to be lubricated by the oil within the housing 12. This direct lubrication of the swivel coupling 25 and the bearing 29, along with the more rigid support of the swivel coupling 25, results in a longer operating life of the swivel coupling 25 and the bearing 29 compared to the conventional mounting of the swivel coupling externally of the housing 12.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A rear end gear box for a racing car having an engine and a rear axle, said rear end gear box being operable to transfer rotational power from said engine to said rear axle, comprising:
   a housing having an input cowling, a transfer cowling and a ring gear cowling;
   an input driveline extending generally longitudinally through said input cowling and including:
      a power input shaft connected to said engine to receive rotational power therefrom;
      a swivel coupling recessed into said input cowling to be protected from damage by said housing and being rotatably supported by a first bearing mounted within said housing, both said swivel coupling and said first bearing being in flow communication with an interior of said housing so that lubricating oil within said housing will provide lubrication for said swivel coupling and said first bearing, said swivel coupling including a coupling sleeve formed with rounded crown splines that accommodate slight movements of said power input shaft relative to said housing;
      a transfer shaft apparatus operatively coupled to said coupling sleeve to receive rotational power therefrom, said transfer shaft apparatus including a shift coupler interconnecting said transfer shaft and a first stub shaft and being operable to disconnect said transfer shaft from said first stub shaft to prevent rotational power from being transferred to said rear axle, said first stub shaft having a first transfer gear mounted thereon and being rotatably supported in said transfer cowling; and
   an output driveline including a second transfer gear mounted for rotation within said transfer cowling in engagement with said first transfer gear, said output driveline including a pinion engaged with an output gear affixed to said rear axle to affect a rotation thereof.

2. The rear end gear box of claim 1 wherein said input driveline is offset transversely from said output driveline.

3. The rear end gear box of claim 2 wherein said input driveline is offset relative to a vertical plane passing through said output driveline through an angular displacement centered on said output driveline to space said input driveline transversely relative to said output driveline.

4. The rear end gear box of claim 3 wherein said angular displacement is approximately 16 degrees.

5. The rear end gear box of claim 3 wherein said output driveline is spaced transversely to the left of the input driveline.

6. The rear end gear box of claim 1 wherein said output driveline comprises:
   a second stub shaft rotatably mounted within said housing and carrying said second transfer gear thereon at a rearward end thereof and said pinion gear mounted on an inner distal end of said second stub shaft, said pinion being engaged with a ring gear mounted within said ring gear cowling and being secured to said rear axle to affect rotation thereof.

7. The rear end gear box of claim 6 wherein said transfer cowling housing said first and second transfer gears includes a cover detachably affixed thereto, said cover including an O-ring mounted thereon for sealing said cover against said transfer cowling.

8. A rear end gear box for a racing car having an engine and a rear axle, said rear end gear box being operable to transfer rotational power from said engine to said rear axle, comprising:
- a housing having an input cowling, a transfer cowling and a ring gear cowling;
- an input driveline extending generally longitudinally through said input cowling and including:
  - a swivel coupling positioned to receive rotational power from said engine and being recessed into said input cowling, said swivel coupling being recessed into said input cowling so as to be rotatably supported by a first bearing mounted in said housing such that said swivel coupling is protected from damage by said housing, both said swivel coupling and said first bearing being in flow communication with an interior of said housing so that lubricating oil within said housing will provide lubrication for said swivel coupling and said first bearing; and
- a transfer shaft apparatus operatively coupled to said coupling sleeve to receive rotational power therefrom, said transfer shaft apparatus including a shift coupler interconnecting said transfer shaft and a first stub shaft and being operable to disconnect said transfer shaft from said first stub shaft to prevent rotational power from being transferred to said rear axle, said first stub shaft having a first transfer gear mounted thereon and being rotatably supported in said transfer cowling; and
- an output driveline including a second transfer gear mounted for rotation within said transfer cowling in engagement with said first transfer gear, said output driveline including a pinion engaged with an output gear affixed to said rear axle to affect a rotation thereof, said output driveline being offset transversely from said input driveline to clear said swivel coupling.

9. The rear end gear box of claim 8 wherein said input driveline is offset relative to a vertical plane passing through said output driveline through an angular displacement centered on said output driveline to space said input driveline transversely relative to said output driveline.

10. The rear end gear box of claim 9 wherein said angular displacement is approximately 16 degrees to space said input driveline transversely to the right of said input driveline.

11. The rear end gear box of claim 10 wherein said transfer cowling in which said first and second transfer gears are mounted includes a cover detachably affixed thereto, said cover including an O-ring mounted thereon for sealing said cover against said transfer cowling.

* * * * *